Feb. 27, 1934.  O. SCHMID ET AL  1,948,772
HEATING DEVICE FOR VEHICLES
Filed Dec. 30, 1929

INVENTORS:
Oscar Schmid
Wilhelm Heitzmann,
by Henry Orth Jr.
atty.

Patented Feb. 27, 1934

1,948,772

UNITED STATES PATENT OFFICE

1,948,772

HEATING DEVICE FOR VEHICLES

Oscar Schmid and Wilhelm Heitzmann, Zurich, Switzerland

Application December 30, 1929, Serial No. 417,452
In Switzerland December 31, 1928

2 Claims. (Cl. 237—12.3)

The present invention relates to heating devices for vehicles driven by internal combustion engines such as automobiles, air craft and motor boats, and comprising a steam generator heated by the combustion gases of the motor and radiators arranged in the interior of the vehicle and supplied with steam from the steam generator.

The known heating devices for motor driven vehicles present the drawback that they require comparatively considerable time for generating the steam necessary for heating purposes as the steam generator contains too large a quantity of water at the beginning of a drive. The cause thereof is the fact that the supply of water to the steam generator has not been cut off at the end of a drive so that the steam generator gradually gets filled and furthermore the known steam generators are not suitable for evaporating the water in very small quantities as is the case when the water is supplied in drops.

This advantage is overcome by the heating device according to the present invention inasmuch as for the purpose of an immediate generation of steam a regulating means for a feed of the water in drops is inserted in the conduit supplying water from a storage vessel to the steam generator as well as means automatically influenced by the suction action of the motor so as to open the water supply as soon as the motor starts and to cut it out as soon as the motor stops in order to prevent the water collecting in a larger quantity in the steam generator during stoppage of the motor.

The steam generator comprises a hollow cylinder swept at its inner and outer side by the combustion gases and in the interior of said hollow cylinder a tube is obliquely arranged, the water, supplied to the upper end of said tube, evaporates on flowing along said oblique tube and the steam being heated in the annular space of the generator.

Figure 1:
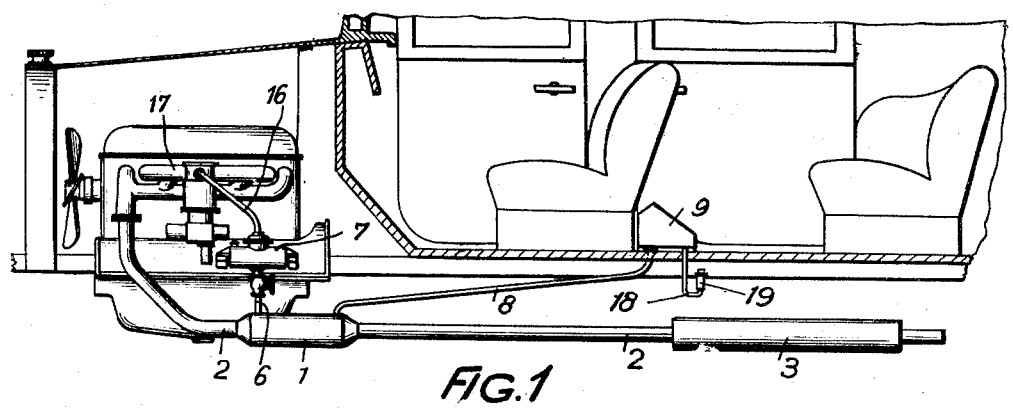
Figure 2:
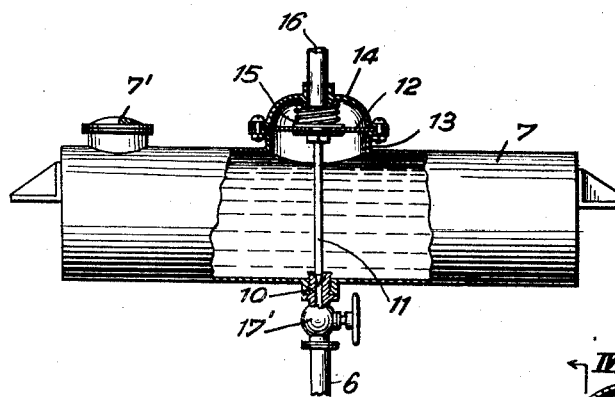
Figure 3:
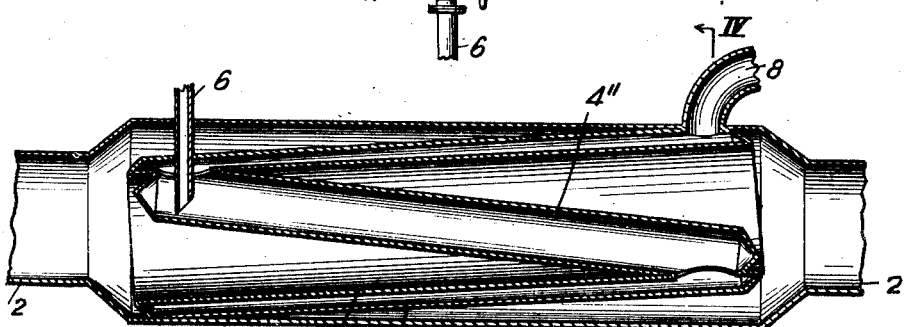
Figure 4:
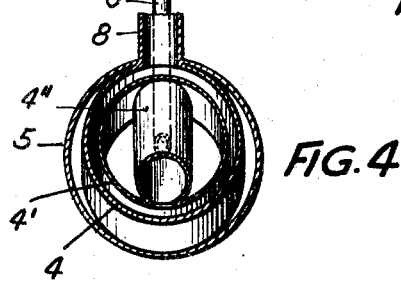

A constructional example of the heating device according to the present invention is illustrated on the accompanying drawing, in which Fig. 1 illustrates the heating device installed in a motor-car, Fig. 2 shows in elevation the storage vessel for the water and in a vertical section the means influenced by the suction pressure of the motor for interrupting the supply of water from the storage vessel to the steam generator, Fig. 3 is an axial section through the steam generator, and Fig. 4 is a section along line IV—IV in Fig. 3.

Referring now to the drawing 1 (Fig. 1) denotes the steam generator inserted in the exhaust conduit 2 of the motor in front of the silencer 3. The steam generator (Figs. 3 and 4) comprises an inner drum having two cylindrical shells 4 and 4' and conical end rings at both ends joining the two shells together. The inner drum is surrounded by an outer drum 5 connected at its two ends to the exhaust conduit 2. The inner drum 4, 4' is obliquely arranged inside the outer drum 5 and joined to the latter at its ends, for instance, by soldering. In the interior of the inner shell 4' a tube 4" is obliquely arranged and in open connection with the inner shell 4' near its ends. To the upper end of the tube 4" water is supplied in the form of drops by a tube 6 of comparatively small diameter from the storage vessel 7 for the water to be evaporated. 7' is a filling plug of the vessel 7 having an air hole. The water supplied through the tube 6 flows down the oblique tube 4" and evaporates. The steam thus generated is distributed in the annular space between the shells 4 and 4', both shells as well as the tube 4" being swept by the hot combustion gases. The steam from the steam generator 1 flows through a conduit 8 of larger cross-section than the tube 6 into a radiator 9 arranged inside the vehicle and designed as a foot-rest.

The water supply tube 6 is screwed into the lower part of the storage vessel 7 and ends therein in a funnel shaped part 10. Into the latter a needle 11 projects which is connected at its upper end to a diaphragm 12. The latter is clamped between a socket 13 provided on the vessel 7 and a cover 14. A spring 15 is inserted inside the cover 14 and urges the diaphragm 12 in the downward direction tending to push the needle 11 into the funnel 10 and to cut off the water flowing from the vessel 7 into the tube 6. To the cover 14 is connected a pipe 16 which is connected at its other end to the intake manifold 17 of the motor. 17' denotes a valve for regulating the quantity of water flowing through the tube 6 into the steam generator and check valve. The suction transmitted from the intake manifold opposes the action of the spring 15. A pipe 18 leads from the radiator 9 into the open to prevent excess pressure in the heating system; 19 is a safety valve.

The operation of the above described device is as follows:

As soon as the motor runs the suction transmitted from the intake manifold causes the diaphragm 12 to bulge in the upward direction and to lift the needle 11 and to permit the water to flow from the vessel 7 in the form of drops to the upper end of the tube 4'' wherein it evaporates by the action of the hot combustion gases and the steam enters the annular space between the shells 4 and 4'. As the inner and outer shells are swept by the hot combustion gases the steam may eventually be superheated and flows through the conduit 8 into the radiator 9 from which the steam which does not condense blows off at the safety valve 19. The water of condensation is returned by the conduit 8 into the steam generator 4, 4'. As soon as the motor is stopped the needle 11 automatically stops the supply of water to the steam generator. The water of condensation formed by the steam in the radiator 9 collects in the pipe leading to the safety valve 19 and is vented out at that valve when a renewed generation of steam sets in. Only the small amount of water of condensation in the pipe 8 flows into the steam generator and is quickly evaporated therein when the heating starts again. If no heating is required the water supply is shut off by the regulating valve 17'.

With the heating device according to the present invention the water is prevented from collecting to any large extent in the steam generator; as soon as the motor starts to run the generation of steam and thereby a heating of the interior of the vehicle sets in. The quantity of water used in this device is a minimum.

I claim:

1. A device of the kind described comprising in combination, a motor vehicle having a passenger compartment and a motor, said motor having an exhaust conduit and an intake conduit, a steam generator interposed in said exhaust conduit, said generator comprising an inner shell and an outer shell, an oblique tube in said inner shell, said inner shell and said outer shell and said tube being swept by combustion gases passing through the exhaust pipe, a radiator in the passenger compartment, a steam pipe connecting said radiator to said steam generator, a storage vessel for the water to be evaporated, a water pipe connecting said storage vessel to said oblique tube, a needle valve controlling the flow of water through said water pipe, a diaphragm connected to the needle of said valve, a conduit connected with the intake manifold for transmitting the suction of the motor to said diaphragm whereby the supply of water to said steam generator is stopped when the motor stops to prevent flooding the steam generator with water, and other means for regulating the flow of water through the water pipe.

2. A vehicle heating system comprising, an engine carried by said vehicle, said engine having an intake manifold, an exhaust conduit carried by said engine, a steam generator adjacent said engine, said steam generator being disposed in the exhaust conduit, a heating radiator in the body of the vehicle, said steam generator having a steam discharge pipe leading to the heating radiator, an upwardly extending water intake pipe carried by the steam generator, a water tank above the steam generator and to which the water intake pipe is connected, a discharge valve carried by the water tank, control means for said valve, a vacuum pipe connecting said control means with the engine intake manifold, said control means being controlled by the engine intake vacuum whereby water will be discharged by gravity from the tank into the generator, only when the engine is running.

OSCAR SCHMID.
WILHELM HEITZMANN.